July 30, 1963  J. S. STELZER  3,099,461
SUSPENSION CONTROL VALVE
Filed July 26, 1957
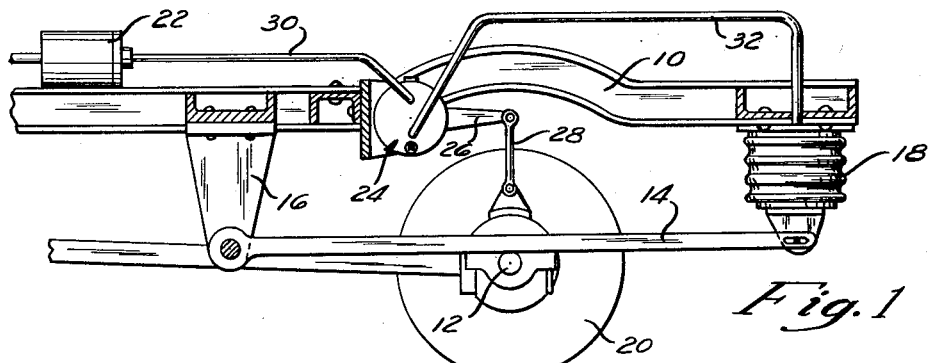
Fig. 1
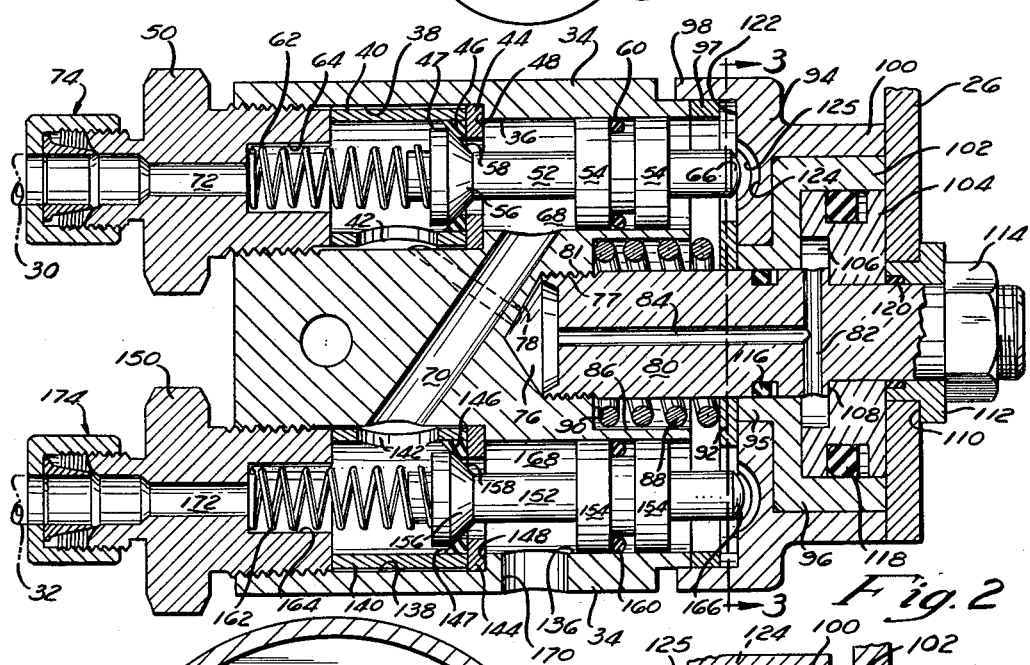
Fig. 2
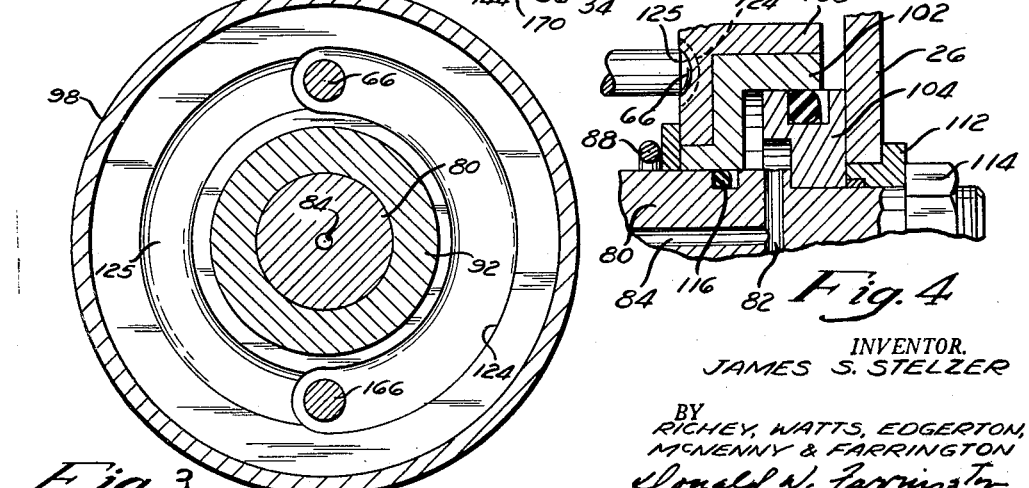
Fig. 3
Fig. 4
INVENTOR.
JAMES S. STELZER
BY
RICHEY, WATTS, EDGERTON,
McNENNY & FARRINGTON
Donald W. Farrington
ATTORNEYS United States Patent Office 3,099,461
Patented July 30, 1963

3,099,461
SUSPENSION CONTROL VALVE
James S. Stelzer, Fort Wayne, Ind., assignor to The Weatherhead Company, Cleveland, Ohio, a corporation of Ohio
Filed July 26, 1957, Ser. No. 674,334
9 Claims. (Cl. 280—124)

This invention relates to an automatic control apparatus for vehicle suspension systems of the type disclosed in applicant's patent application Serial No. 652,394, filed April 12, 1957, now Patent No. 2,964,311 assigned to the present assignee, and more particularly to a valve apparatus including a remote control device operable in an automatic controlling system for rendering the automatic control apparatus effective to maintain a constant average level of the chassis or frame of a vehicle with respect to the axle thereof only when air under pressure is supplied to the system.

Broadly, this invention comprehends the provision of a valve apparatus for controlling air flow to or from an air spring in a vehicle suspension system for maintaining a constant average spacing between vehicle frame and axle, irrespective of vehicle load wherein responsiveness of the valve apparatus to differential spacing between frame and axle is dependent on the presence or absence of a supply of air under pressure to the control system. A cam plate, pivotal for selectively opening inlet and exhaust valves to an air spring, is biased by a spring for disengagement from the mentioned valves and is movable against the spring bias under the influence of air pressure supplied to the control system to engage the valves and render the apparatus responsive to differential spacings between vehicle frame and axle.

Among the prior control systems of the type herein disclosed, many have been imperfect in the respect that they are responsive in all events to differential spacing of frame and axle to open channels providing communication between an air spring and either an air supply chamber or ambient space. It is, of course, desirable to accomplish such results whenever air under pressure is supplied and maintained in the air supply chamber but it is advantageous to prevent opening of either of such channels whenever the air supply chamber should be at low pressure for any reason at all. As may be readily understood, communication provided between an inflated air spring and an air supply chamber at low pressure at a time when the system requires further inflation of the air spring, would be effective to completely deflate the air spring and render it completely inoperative resulting in possible damage to the vehicle and discomfort to passengers should the vehicle be driven in such condition. In addition, among many such prior control systems, no provision was made for preventing opening of the control valves in response to back pressure against the valve that may exceed the sum of the forward pressure and the bias spring pressure. In response to such back pressures, loss of control may result in cases of low pressure in the air supply chamber since back pressures may open the supply line valve and discharge air from the air spring into the air source. Also, in cases of sufficient pressure in the air supply chamber, unnecessary operation of the system may result whereby air discharged from the air spring into the air supply chamber must be immediately replenished by a reverse flow.

Accordingly, it is an object of this invention to provide a control valve, operable in a vehicle air suspension system for maintaining a constant spacing between vehicle frame and axle, that is unresponsive in the absence of a supply of air under pressure, to either inflate or deflate an air spring in response to differential spacing of chassis and axle of the vehicle.

It is another object of this invention to provide a control apparatus for an air suspension system having a control valve with a valve cam actuator that is engageable with the valves only during the presence of air under pressure in an air supply chamber.

It is another object of this invention to provide in a control apparatus for a vehicle air suspension system, a valve cam actuator that is slidable into and from engagement with valves for controlling flow to or from an air spring, under the influence of a piston responsive to air pressure in a supply chamber and a bias spring, respectively.

It is another object of this invention to provide a control apparatus having channels therein controlled by a pair of poppet valves that may be opened only by cam actuating means irrespective of presence or absence of air pressure in any part of the valve.

It is another object of this invention to provide a control apparatus for regulating flow to or from a vehicle air spring including valves having surface areas exposed to air under pressure in the air spring urging the valves into closed position.

Other and further objects of advantage will appear from a detailed description of the invention taken with the accompanying drawings in which, FIG. 1 illustrates a fragmentary cross-sectional view of a vehicle to which this invention is applied, FIG. 2 illustrates in cross-section, the valve apparatus of this invention, FIG. 3 illustrates a side view of a cam plate forming a part of the valve of FIG. 2, and FIG. 4 illustrates a fragmentary sectional view of the valve apparatus in operative position.

Referring now more particularly to FIG. 1 of the drawings, 10 represents a vehicle frame supported above the vehicle axle 12 by a cross bar 14 pivotally secured at one end to a bracket 16 and pivotally secured to a lower portion of an air spring 18 at the other end. Bracket 16 and spring 18 are secured to frame 10 at the ends remote from their connections to cross bar 14. Axle 12 is supported between a pair of wheels, one of which is shown at 20.

An air supply chamber 22 is mounted on frame 10 at a suitable location for supplying air to air spring 18 under control of a valve 24 which is also mounted on frame 10 and movable therewith. A valve actuating arm 26 extends from the valve body to a linking arm 28 pivotally secured at respective ends to the end of arm 26 and axle 12. A conduit 30 communicates between air supply chamber 22 and inlet of valve 24 and a conduit 32 communicates between the outlet of valve 24 and the interior of spring 18 which may be a bellows of a type well known.

Frame 10 is supported above axle 12 by the compressed air in spring 18 and in a vehicle of uniform load the static level of frame 10 above axle 12 varies according to the air pressure in spring 18. Similarly for constant air pressure in spring 18, the level of frame 10 varies according to the load in the vehicle supported by frame 10. To maintain an even level of frame 10 with respect to axle 12 irrespective of load, the air pressure in spring 18 is varied under the control of valve 24. Decreased spacing between frame 10 and axle 12 is effective in causing the actuation of arm 26 to admit air into spring 18 from supply chamber 22 through valve 24 and increased spacing between frame 10 and axle 12 is effective in causing the actuation of arm 26 to vent air spring 18 to atmosphere through valve 24 in a manner explained in detail hereinbelow.

According to a feature of this invention, the actuation of arm 26 is ineffective to admit air to or discharge it from air spring 18 unless air under pressure exists in air chamber 22 and according to another feature of the invention back pressure of any proportions in air spring 18 is ineffective to discharge air from the air spring to air chamber 22 and air from ambient space is ineffective to pass through valve 24 into air spring 18 or air chamber 22.

Referring now to FIG. 2 of the drawings, 34 represents the body or housing of valve 24. Housing 34 is provided with a pair of parallel and similar channels 36 and 136 having similar components operating similarly and herein set forth and described together. Each channel 36 and 136 is enlarged at 38 and 138, respectively, for receiving respective sleeves 40 and 140 apertured, respectively, at 42 and 142 for purposes to be made clear hereinbelow. Enlargements 38 and 138 receive respective washers 44 and 144 and respective annular valve seats 46 and 146 with conical surfaces 47 and 147. Washers 44 and 144 and seats 46 and 146 together with respective sleeves 40 and 140 are retained against respective shoulders 48 and 148 in the spaced channels by respective nipples 50 and 150 engaging the inner walls of enlargements 38 and 138. Seats 46 and 146 are preferably made of a durable plastic material and are secured to respective sleeves 40 and 140 by a suitable cement. Channels 36 and 136 receive respective poppets having stems 52 and 152 enlarged at spaced portions 54 and 154 intermediate their respective ends and having respective heads 56 and 156 with respective conical surfaces 58 and 158 engageable with conical surfaces 47 and 147 of annular seats 46 and 146. Suitable O rings 60 and 160 are disposed in respective annular recesses between enlargements 54 and 154 for preventing flow of air therepast. Heads 56 and 156 of the poppets are urged against their respective seats 46 and 146 to provide tight, sealing engagement between the conical surfaces 47, 147 and 58, 158 by biasing springs 62 and 162 bearing at one end against heads 56 and 156, respectively, and against fixed bottoms of recesses 64 and 164 in nipples 50 and 150, respectively. In the absence of other influence, under the bias of the springs, poppet heads 56 and 156 engage respective seats 46 and 146 to prevent flow of air therepast. The remote ends 66 and 166 of poppet-stems 52 and 152 protrude beyond housing 34 and are cam actuated in a manner to be described hereinbelow.

Spaces about poppet stems 52 and 152 form a pair of chambers 68 and 168 communicable, respectively, with enlargement 138 and ambient space through respective passages 70 and 170. Nipples 50 and 150 are apertured at 72 and 172 and communicate, respectively, with conduits 30 and 32 through suitable couplings 74 and 174.

Housing 34 is provided with an aperture 76 communicating at its inner counter-sunk end with enlargement 38 through a cross passage 78. A stud 80 is secured in aperture 76 by threads 81 at the end thereof engageable with threads 77 in aperture 76 and is provided with a transverse bore 82 and a longitudinal bore 84 extending between bore 82 and the end of the stud to provide communication between the transverse bore 82 and the countersunk end of aperture 76.

Aperture 76 is enlarged at 86 to receive a spring 88 bearing at one end against a shoulder 90 and at the other end against a washer 92 engageable with a cam plate 94 and an axial flange 95 of a cylinder 96 concentrically mounted on stud 80. Cam plate 94 is axially flanged at 98 to slidably enclose variable reduced portions of housing 34 and a spacer ring 97 and is axially flanged at 100 enclosing an axial flange 102 of cylinder 96. It is clear that as an alternative, plate 94 and cylinder 96 may comprise a single unitary member.

A piston 104, having a recess forming an expansion chamber 106 between piston 104 and cylinder 102, is mounted on stud 80. Cam plate 94, cylinder 96 and piston 104 are secured for unitary pivotal movement about the axis of stud 80 and are in inter-engagement along irregular surfaces. Piston 104 is restrained from axial movement between a shoulder 108 on stud 80 and the inner end of a bushing 112 tightly held in place by a nut 114 threaded on the end of stud 80. Suitable seals 116, 118 and 120 are provided between stud 80 and cylinder 96, piston 104 and bushing 112 to prevent the flow of air therepast.

Cam plate 94 is provided with a generally flat face 122 having a first groove 124 of an extent slightly greater than a semi-circle and a second groove 125 somewhat shallower in the face of cam plate 94 and forming a continuation of groove 124. Grooves 124 and 125 together circumscribe a circle as shown more clearly in FIG. 3 of the drawings. When cam plate 94 is in an extreme position toward housing 34 as shown in FIG. 4 of the drawings, groove 124 is slightly removed from the axial outward extremity of either of ends 66 or 166 of the poppets 52 and 152 and groove 125 is somewhat closer to housing 34 than the axial extremity of ends 66 and 166 so as to enable unseating of valve heads 56 and 156 as appropriate. Cam plate 94 is axially slidable into and out of engagement with stud ends 66 and 166 and in an initial engaging position, ends 66 and 166 are engageable and fit in the extremities of groove 124. In such initial position, poppet heads 56 and 156 engage valve seats 46 and 146, respectively, to permit closure of the respective valves under the influence of springs 62 and 162 irrespective of axial position of cam plate 94. Cam plate 94 when positioned as shown in FIG. 4 is pivotal from its initial position in one direction to cause end 66 of poppet stem 52 to engage the shallow grooved face portion 125 of the cam plate to thrust the poppet stem 56 axially to unseat poppet head 56. Similarly, the cam plate is pivotal in a reverse direction from initial position to unseat poppet head 156.

As a feature of the invention, expansion chamber 106 receives air under pressure from air source 22 under all circumstances. Since piston 104 is axially immovable relative to other parts of the valve apparatus, an axial movement of cylinder 96 and cam plate 94 against the force of spring 88 is effected to provide engagement between cam plate 94 and ends 66 and 166 of poppet stems 52 and 152 as illustrated fragmentarily in FIG. 4.

For an understanding of the invention it is assumed that housing 34 and cylinder 22 are secured to frame 10, that the end of arm 26 is secured to axle 12 and that conduits 30 and 32 are connected to valve 24 in a manner shown in FIG. 1 of the drawings. It is also assumed that the vehicle to which this invention is applied is stationary and frame 10 of the vehicle is at the desired level or in other words that frame 10 is spaced from axle 12 as desired for optimum results as to appearance and riding qualities. Chamber 22 contains air under considerable pressure which is applied to expansion chamber 106 through aperture 72, enlargement 38, passage 78, bores 84 and 82 to move cam plate 94, in its extreme extended position adjacent poppet stem ends 66 and 166, and arm 26 and cam plate 94 are so positioned that ends 66 and 166 of the poppet stems are aligned with respective ends of groove 124. In response to loading, chassis 10 is lowered with respect to axle 12 to impart a pivotal motion to arm 26 and cam plate 94 in a direction to unseat poppet head 56 through engagement of groove 125 and end 66 to allow flow of air into air spring 18 from chamber 22 through conduit 30, aperture 72, recess 40, enlargement 38, aperture 42, chamber 68, passage 70, aperture 142, enlargement 138, recess 140, aperture 172 and conduit 32 until the level of frame 10 rises sufficiently to pivot arm 26 and cam plate 94 to allow return of poppet end 66 to align with the end groove 124 under the influence of spring 62 and air pressure in enlargement 38. Similarly, reduction in load is effective to pivot cam plate 94 in a reverse direction to actuate poppet head 156 through poppet end 166 to provide communication between air spring 18 and ambient space through conduit 32, aperture 172, recess 140, enlargement 138, chamber 168 and vent 170. Sufficient deflation of air spring 18 is effective to lower the level of frame 10 sufficiently to pivot arm 26 and cam plate 94 to align the end portion of groove 124 with poppet end 166 to allow seating of head 156 under the influence of spring 162 and air under pressure in enlargement 138.

It is noted that in the event that the pressure in air chamber 22 should diminish to a low level, the pressure in expansion chamber 106 similarly diminishes to such low level since direct communication is provided therebetween as described. Accordingly, a sufficient drop in air pressure in expansion chamber 106 allows axial retraction of cam plate 94 away from housing 34, under the influence of spring 88. Axial movement of cam plate 94 and cylinder 96 against diminished air pressure in chamber 106 occurs. As a consequence, pivotal movement of cam plate 94 in response to differential spacing between frame 10 and axle 12 is ineffective to unseat either of the popper heads 56 and 156. It should be observed that in the absence of such retraction of cam plate 94, increased loading of the vehicle occurring while air chamber 22 contains air under low pressure would effect an unseating of head 56 and a discharge of air from spring 18 into chamber 22 rather than a discharge of air from chamber 22 into spring 18 as would be appropriate under the circumstances. Accordingly, the present device is effective to guard against complete failure of an air spring subsequent to inflation thereof as would occur in the manner described. By means of a novel piston-cylinder arrangement, the cam plate 94 is adjacent to poppet stem ends 66 and 166 whenever sufficient air pressure exists in the system supply chamber 22 and is removed whenever insufficient air pressure exists in the air supply chamber. In addition to the improved operational qualities imparted to the vehicle by this feature of the invention, the vehicle is rendered safer and less susceptible to damage or injury.

As a further feature of this invention, back pressure in air spring 18 greater than the combined equivalent pressure of air in chamber 22 and spring 62 is ineffective to unseat poppet head 56 since the axial end of enlargement 54 of stem 52 is exposed to the same back pressure applied to head 56. The effective area of enlargement 54 is made greater than that of head 56 exposed to back pressures whereby back pressures are effective to increase the engagement between head 56 and seat 46 rather than to decrease such engagement. Accordingly, increased back pressures which may occur in air spring 18 are ineffective to discharge air therefrom into air chamber 22.

Having thus described this invention in such full, clear, concise and exact terms as to enable any person skilled in the art to which it pertains to make and use the same, and having set forth the best mode contemplated of carrying out this invention, I state that the subject matter which I regard as being my invention is particularly pointed out and distinctly claimed in what is claimed, it being understood that equivalents or modifications of, or substitutions for, parts of the above specifically described embodiment of the invention may be made departing from the scope of the invention as set forth in what is claimed.

What is claimed is:

1. In a suspension system for supporting a vehicle frame in a predetermined position relative to a vehicle axle comprising an air spring disposed between said frame and axle, a source of air under pressure and a control valve apparatus mounted on said frame, said apparatus including a first valve having a poppet actuable to provide communication between said air source and air spring, a second valve having a poppet actuable to provided communication between said air spring and ambient space, cam means being pivotal in one axial position for selectively actuating said poppets, a spring bearing against said cam means and urging the same away from said poppets, a movable cylinder bearing against said cam means, a fixed piston within said cylinder and an expansion chamber between spaced portions of said cylinder and piston, means providing communication between said expansion chamber and said air source, said cylinder and cam means being movable in response to air pressure in said expansion chamber to facilitate engagement between said poppets and said cam means in response to pivotal motion of said cam means, means pivoting said cam means in response to decreased spacing between said frame and axle, to open said first valve and in response to increased spacing between said frame and axle to open said second valve and means urging said poppets to closed position in the absence of actuation thereof by said cam means.

2. A valve apparatus comprising a housing having a first multi-partite channel therethrough and a second multi-partite channel therethrough, a source of air under pressure connected to said housing, portions of said channels being co-extensive, a first valve interposed in said first channel including a seat and a poppet having a head movable relative to said seat, a second valve interposed in said second channel including a seat and a poppet having a head movable relative to said seat, a pair of springs in said channels for urging said heads against the corresponding seats, a cam plate having an arcuate groove in a flat face thereof and being longitudinally movable into proximity with ends of said poppets, means urging said cam plate longitudinally away from said poppets and an expansion chamber on the side of said cam plate remote from said last mentioned means responsive to air under pressure in said air source for moving said cam plate into proximity with said poppet ends.

3. A valve apparatus according to claim 2 wherein said poppet ends align with and engage said cam plate at the extremities of said groove in one position thereof and wherein said cam plate is pivotal in either direction from said position to selectively actuate said poppets to provide communication between said respective channels.

4. A valve apparatus according to claim 2 wherein each of said poppets is provided with an enlargement of effective area exposed to the confines of respective channels that is greater than the effective exposed area of the corresponding head facing its seat.

5. In a suspension system for supporting a vehicle frame in a predetermined position relative to a vehicle axle comprising an air spring disposed between said frame and axle, a source of air under pressure and a control valve apparatus mounted on said frame, said valve apparatus including a first valve stem actuable to open a valve and provide communication between said air source and said air spring, a second valve stem actuable to open a valve and provide communication between said air spring and ambient space, a cam plate having a face in a plane substantially perpendicular to said stems and an arcuate groove in the face thereof, said plate positionable in one position to receive the ends of said stems and being pivotal in either direction from said one position to cam against either of said stems at portions removed from said groove to open one of said valves, means responsive to differential spacing between said frame and axle to pivot said cam plate, and safety means moving in response to a predetermined low pressure at said source to move said cam plate axially away from the ends of said valve stems.

6. In a suspension system for supporting a vehicle frame in a predetermined position relative to a vehicle axle comprising an air spring disposed between said frame and axle, a source of air under pressure and a control valve apparatus mounted on said frame, said valve apparatus including a first valve stem actuable to open a valve and provide communication between said air source and said air spring, a second valve stem actuable to open a valve and provide communication between said air spring and ambient space, a cam plate having a face in a plane substantially perpendicular to said stems, a groove in said face for receiving one end of each of said stems in one position of said plate, a groove portion contiguous with each end of said groove and being shallower than said first mentioned groove, said cam plate being pivotal from said one position to cause said shallower groove portion to cam against one of said stems to open a corresponding valve and means responsive to differential spacing between said frame and axle to pivot said cam plate.

7. In a suspension system for supporting a vehicle frame in a predetermined position relative to a vehicle axle comprising an air spring disposed between said frame and axle, an air supply chamber mounted on said frame, a control valve mounted on said frame, a first conduit leading from said air supply chamber to the control valve, a second conduit connecting said control valve and said air spring, operating means for said control valve comprising a lever pivoted at one end on the control valve and having a link connected to the other end and through said vehicle axle to move said lever in response to changes in spacing between the frame and axle, said control valve including a first reciprocating poppet operable to open a passageway between said first conduit and said second conduit to direct air from said air supply chamber to said air spring, said control valve having a second reciprocating poppet operable to open an exhaust passageway to exhaust air from said air spring, and control means operatively connected to said lever for operating said poppets in response to movement of said lever, means to prevent the exhaust of said air spring in response to pressure drop in said air supply chamber comprising an air cylinder member, a piston member mounted in said cylinder member, a passageway leading from said first conduit to said air cylinder member to move one of said members in one direction in response to a predetermined high pressure in said air supply chamber, said control means being operated by said one member, when the latter moves in said one direction, to a position in which it is effective to operate said poppets in response to movement of said lever, and a spring operatively connected to said one member to bias the latter in the opposite direction in response to a predetermined low pressure in said air supply chamber, said control means being operated by said one member, when the latter moves in said opposite direction, to a position in which it is ineffective to operate said poppets in response to movement of said lever.

8. A control valve for a leveling system for a vehicle using pressurized fluid and comprising a valve housing having a first pressure port adapted to connect to a pressurized supply of leveling fluid and a second port adapted to connect to a leveling device for controlling the supply of fluid thereto, a control mechanism including a valve within said housing controlling communication between said ports, a movable control member connected to operate said valve and adapted to be connected to be responsive to differences in the level of the wheel of the vehicle relative to its frame and to open the valve for communication between said ports at a predetermined maximum difference in the relative level of the wheel, a clutch between said valve and said control member, pressure responsive means connected to said first pressure port and to said clutch and engaging said clutch when said port is pressurized and disengaging said clutch when the pressure at said port drops to a predetermined non-operative level, and means automatcially closing said valve upon disengagement of said clutch, said valve free of apparatus preventing its closing whereby fluid cannot bleed from the second to the first port with pressure failure.

9. In a suspension system for supporting a vehicle frame in a predetermined position relative to a vehicle axle comprising an air spring disposed between said frame and axle, an air supply chamber mounted on said frame, a control valve mounted on said frame, a first conduit leading from said air supply chamber to the control valve, a second conduit connecting said control valve and said air spring, operating means for said control valve comprising a lever pivoted at one end on the control valve and having a link connected to the other end and through said vehicle axle to move said lever in response to changes in spacing between the frame and axle, said control valve including a first reciprocating poppet operable to open a passageway between said first conduit and said second conduit to direct air from said air supply chamber to said air spring, said control valve having a second reciprocating poppet operable to open an exhaust passageway to exhaust air from said air spring, and control means operable by said lever for operating said poppets in response to movement of said lever, means to prevent the exhaust of said air spring in response to pressure drop in said air supply chamber comprising an air cylinder member, a piston member mounted in said cylinder member, a passageway leading from said first conduit to said air cylinder member to move one of said members in one direction in response to a predetermined high pressure in said air supply chamber, said control means being operated by said one member, when the latter moves in said one direction, to a position in which it is effective to operate said poppets in response to movement of said lever, and a spring operatively connected to said one member to bias the latter in the opposite direction in response to a predetermined low pressure in said air supply chamber, said control means being operated by said one member, when the latter moves in said opposite direction, to a position in which it is ineffective to operate said poppets in response to movement of said lever.

References Cited in the file of this patent

UNITED STATES PATENTS

| | | |
|---|---|---|
| 1,816,075 | Down | July 28, 1931 |
| 2,012,596 | Anderson | Aug. 27, 1935 |
| 2,409,765 | Kehle | Oct. 22, 1946 |
| 2,670,201 | Rossman | Feb. 23, 1954 |
| 2,820,647 | Jackson | Jan. 21, 1958 |
| 2,841,178 | Schultz | July 1, 1958 |
| 2,860,607 | Orloff | Nov. 18, 1958 |

FOREIGN PATENTS

| | | |
|---|---|---|
| 3,974 | Great Britain | Feb. 25, 1905 |